Patented Mar. 29, 1927.

1,622,391

UNITED STATES PATENT OFFICE.

FERDINAND W. NITARDY, KENNETH A. BARTLETT, AND FRANTZ F. BERG, OF BROOKLYN, NEW YORK, ASSIGNORS TO E. R. SQUIBB AND SONS, OF NEW YORK, N. Y., A CORPORATION OF NEW YORK.

DENTIFRICE.

No Drawing.   Application filed September 26, 1924. Serial No. 740,031.

This invention relates to dentrifice materials, and has for its object the provision of an improved dentrifice material adapted to be incorporated in dental creams. More particularly the invention involves the provision of an improved dental cream having a base of solidified glycerin with which is incorporated glycerite of magnesia and appropriate cleansing materials.

The improved dentifrice material of the invention, in its broad aspect, is particularly adapted to constitute the base or body for a dental cream. In this form, the improved dentifrice material is a firm, jelly-like solid consisting for the most part of glycerin and containing a small percentage of an alkali metal stearate. Sodium stearate is preferred but potassium or ammonium stearate can be used. This jelly-like glycerin product may be advantageously combined with an acid-neutralizing agent such as glycerinated magnesia and other appropriate dentifrice materials.

A relatively small amount of one of the mentioned stearates changes glycerin from a liquid to a firm jelly-like solid possessing peculiar advantages as the base or body for dental creams. Thus, for example, we have secured excellent results by combining sodium stearate and glycerin in the proportions of 588 parts of sodium stearate to 17,460 parts of glycerin, or approximately one part of sodium stearate to thirty parts of glycerin. These proportions may be varied within a reasonably wide range, as, for example, from one to five parts of sodium stearate per sixty parts of glycerin. Too much sodium stearate makes the product too firm and solid for use in dental creams, and conversely too little sodium stearate fails to sufficiently solidify the glycerin. For convenience, we refer to this glycerin-sodium stearate dentifrice product as solidified glycerin.

The sodium stearate and glycerin may be incorporated and combined in any appropriate manner. Although the sodium stearate content of the finished product is extremely small, nevertheless, this product is a relatively firm jelly which would be too firm even as a base for tooth paste or dental cream. This difficulty is overcome by grinding or otherwise breaking up the firm jelly-like glycerin-sodium stearate product with other dentifrice materials, thus reducing the jelly-like product to extremely small particles and hence forming a plastic mass of proper consistency for a dental cream.

The improved glycerin-sodium stearate dentifrice product of the invention is absolutely stable under a wide range of temperature fluctuation. Neither freezing nor the highest tropical summer heat will affect the product detrimentally. It is particularly free from syneresis which, in preparations containing gelatin, tragacanth or other gums, causes the liquid constituents to be forced out of the jelly. The jelly-like product is tasteless except for a slight glycerin taste, and when taken into the mouth slowly dissolves, leaving the sensation of having taken a quantity of glycerin into the mouth. As the bulk of material introduced to solidify the glycerin is extremely small, and as the product is neutral and chemically stable, tasteless and odorless and not prone to decomposition, molding, putrefaction and other changes such as occur in gelatin and other substances frequently used as binders for preparations of this kind, the improved product has distinct and peculiar advantages, particularly in the preparation of dental creams.

The improved glycerin-sodium stearate product can be combined with the usual cleansing ingredients but it is especially valuable in a magnesia dental cream because it does not react chemically with milk of magnesia, but, in fact, forms with such magnesia product an absolutely stable combination of proper and satisfactory consistency as a dental cream. It has an added advantage in lending body to the dental cream in the mouth of the user, milk of magnesia alone being unsatisfactory because it does not give the sensation of sufficient body when used as a dentifrice.

In making a magnesia dental cream we prefer to use substantially equal parts of the solidified glycerin product hereinbefore described and glycerite of magnesia or glycerinated milk of magnesia. We have secured excellent results by combining 18,048 parts of solidified glycerin with 15,125 parts of glycerite of magnesia. The relative proportions of solidified glycerin and glycerite of magnesia will depend generally upon the percentage of magnesia desired in the finished dental cream, and it will be understood that these proportions are susceptible of variation over a considerable range. It will, moreover, be understood that suitable amounts of precipitated chalk or other polishing powder, flavoring agents, antiseptics and other suitable substances may be incorporated in the dental cream or tooth paste, in addition to the solidified glycerin and glycerite of magnesia.

In the preparation of a magnesia dental cream, we preferably proceed as follows in the production of the glycerite of magnesia. A suspension of magnesium hydroxide in water is first produced by precipitating a soluble magnesium salt or in any suitable manner, various methods being known in the art. The water is then drained from the suspension so far as this is possible, leaving a mass of magnesium hydroxide suspended in approximately 86% of water by weight based upon the total weight of the mass. The proportions of magnesium hydroxide and water will, of course, vary, depending upon the time during which the mass is permitted to drain.

After draining, the mass is placed in a suitable evaporating pan which may be operated under vacuum, or otherwise depending upon the available equipment. The pan should be of glass, Monel metal, or other suitable material which is not susceptible to corrosion in the presence of weak alkalies. Glycerin of U. S. P. purity is added to the mass in proportion to provide an amount equivalent to the amount of water therein, and the mass is subjected to evaporation until the water has been removed substantially. It is not necessary that all of the water be separated since it is the function of the glycerin to retard the chemical activity of the magnesium hydroxide and this will be accomplished with a predominating proportion of glycerin in the mass. At the conclusion of the evaporation the mass will consist of a thick paste of approximately the consistency of thick syrup containing about fourteen percent of magnesium hydroxide suspended in glycerin. The proportions will vary depending upon the amount of glycerin which is added and are of relatively slight importance.

This glycerinated milk of magnesia, or suspension of magnesium hydroxide in glycerin, is adapted to be incorporated with various other ingredients in proper proportions to produce a dentrifrice of the desired consistency. In accordance with the present invention, the suspension of magnesium hydroxide in glycerin is incorporated with or ground together with the jelly-like glycerin-sodium stearate base to form a plastic mass of proper consistency for a dental cream. Due to the fact that there is no substantial quantity of water present in the glycerinated magnesia, it is free from the tendency to harden in the presence of other ingredients of the dental cream and furnishes sufficient mild alkali to neutralize mouth acidity formed by the decay of food débris around the teeth.

We claim:

1. A dental cream comprising a suspension of magnesium hydroxide in glycerin combined with solidified glycerin.

2. A dental cream comprising a suspension of magnesium hydroxide in glycerin incorporated with a base made up of a solution of a small amount of sodium stearate in glycerin.

3. A dental cream comprising a suspension of magnesium hydroxide in glycerin incorporated with a jelly-like base made up of from one to five parts of sodium stearate and sixty parts of glycerin.

4. A dental cream comprising a suspension of magnesium hydroxide in glycerin incorporated with a jelly-like base made up of glycerin and sodium stearate in the proportion of approximately one part of sodium stearate to thirty parts of glycerin.

5. The method of preparing dental cream, which comprises forming a jelly-like mass by combining glycerin with an alkali metal stearate, grinding the jelly-like mass and incorporating a scouring or cleansing agent therewith.

6. The method of preparing dental cream, which comprises combining glycerin with an alkali metal stearate, grinding the jelly-like resulting mass and incorporating a suspension of magnesium hydroxide in glycerin therewith.

7. The method of preparing dental cream, which comprises solidifying glycerin with an alkali metal stearate and mixing glycerite of magnesia with the solidified glycerin until the product has a uniform consistency.

In testimony whereof we affix our signatures.

FERDINAND W. NITARDY.
KENNETH A. BARTLETT.
FRANTZ F. BERG.